United States Patent [19]

Mishliborsky

[11] Patent Number: 4,718,287

[45] Date of Patent: Jan. 12, 1988

[54] FORCE SENSING DEVICE FOR MEASUREMENT APPARATUS

[75] Inventor: Zvy Mishliborsky, Paris, France

[73] Assignee: Esselte Moreau, Saint Maure, France

[21] Appl. No.: 871,887

[22] Filed: Jun. 6, 1986

[51] Int. Cl.[4] .............................................. G01L 1/22
[52] U.S. Cl. .................. 73/862.65; 177/211; 177/229
[58] Field of Search ...................... 73/862.65; 177/211, 177/229; 338/2, 5

[56] References Cited

U.S. PATENT DOCUMENTS

| | | | |
|---|---|---|---|
| 2,866,059 | 12/1958 | Laimins | 338/5 |
| 3,512,595 | 5/1970 | Laimins | 73/862.65 X |
| 4,143,727 | 3/1979 | Jacobson . | |
| 4,432,247 | 2/1984 | Takeno et al. . | |
| 4,450,922 | 5/1984 | Alexandre . | |
| 4,520,339 | 5/1985 | Utsunomiya | 73/862.65 X |
| 4,557,150 | 12/1985 | Utsunomiya . | |

FOREIGN PATENT DOCUMENTS

| | | |
|---|---|---|
| 0053337 | 6/1982 | European Pat. Off. . |
| 0094290 | 11/1983 | European Pat. Off. . |
| 2505496 | 11/1982 | France . |
| 2509465 | 1/1983 | France . |
| 0114735 | 9/1981 | Japan ...................................... 338/2 |
| 353555 | 5/1961 | Switzerland . |

Primary Examiner—Charles A. Ruehl
Attorney, Agent, or Firm—Browdy and Neimark

[57] ABSTRACT

A force sensing device comprises a parallelepipedic block, the height of which is larger than its width, and which is provided with an opening in the direction of its width so as to form a parallelogram made deformable by the presence of thinner zones in the direction of its height; flexural deformation sensitive elements are fixed to a substantially horizontal section of the block opposite two of the thinner zones which are of a higher flexibility than the other thinner zones. This allows significantly easier manufacturing of low costs while combining high accuracy of measurement and low sensitivity to eccentric loads.

15 Claims, 5 Drawing Figures

FORCE SENSING DEVICE FOR MEASUREMENT APPARATUS

This invention relates to a force sensing device for measurement apparatus such as a weighing instrument.

Force sensing devices are already known, consisting of a parallelepipedic block formed with recesses therein defining thinner sections of lesser strength of which the deformation is measured under the action of a mass to be weighed with elements adapted to detect deformations such as strain gauges.

The force sensing devices of the mentioned type generally comprise an application area cantilevered, located close to a corner of the block on its lower face and a reception area for the force to be measured located close to a corner diagonally opposite to that mentioned above in the upper face of the block.

Practically, to the reception area of the force to be measured there is added a plate on which a mass to be weighed is placed in any point. It is to be understood that for an accurate measurement of such mass it is appropriate to eliminate (or reduce to minimum) the spurious influence of the position of the mass on the plate; therefore, it appears to be suitable for such devices to be made as little sensitive as possible to flexure moments created by eccentric forces.

To this end, various block geometries have been proposed, one of which, proposed in the French patent FR-No. 2,386,024 or the patent EP-No. 0 060 766 is entirely satisfactory.

These patents propose a parallelepipedic block the maximum and minimum constant dimensions of which (respectively called "length" and "width") are oriented in a horizontal plane while the third dimension intermediary between the width and the length called the "height" is vertically oriented. Various recesses are formed in the block in the direction of its width so as to define a deformable parallelogram comprising two vertical uprights connected by thinner zones to horizontal transverse elements, with both vertical uprights being connected to one another between the horizontal transverse elements, by two horizontal beams connected by a central vertical flexural element which may be fixed perpendicular to the direction of the width. This central element permits elimination of flexural moment generated by the eccentric forces. Measurement of the applied load is made by gauges disposed on either side of a thinner zone through which one of the beams is connected to the corresponding upright on the side of the application area.

Another geometry is proposed by U.S. Pat. No. 4,432,247 which proposes such a block having its smallest dimension (height) oriented vertically; such block is formed with recesses therein in the direction of the width; this latter dimension, although being lower than the length (also oriented horizontally) is much higher than the height. Such recesses define a very flattened parallelogram comprising two massive horizontal uprights connected through thinner zones of large dimension (in the direction of the width) to upper and lower plates. Measurement of the mass to be weighed is given by strain gauges secured above the thinner zones bordering the upper plate of such block which therefore behaves as a whole as a flexure beam. Some insensitivity to flexural moments generated by the eccentric forces is obtained due to the high width which confers good rigidity in the horizontal plane to the block.

It is to be noted that sensitivity of a force sensor formed of a recessed parallelepipedic block of any one of the above-mentioned types diminishes where its width increases, thereby resulting that the low sensitivity to the eccentric forces of the flexural beam of U.S. Pat. No. 4,432,247 corresponds to low sensitivity and therefore low accuracy in measurements.

This invention relates to a force sensor of the type comprising a parallelepipedic block recessed in the direction of its width which both presents large sensitivity and therefore high accuracy (due to a low width much lower than the height of said block) and a very low sensitivity to eccentric forces, with an overall geometry which is however simpler and easier to obtain (at lesser costs) than those proposed in the above mentioned documents FR-No. 2,386,024 and even EP-No. 0 060 766.

To this end, the invention proposes a force sensor as a weighing instrument of the type comprising a generally parallelepipedic block the length and width of which are measured according to perpendicular horizontal axes and the height of which is measured according to a vertical axis, such block being recessed therein in the direction of its width so as to comprise two vertical uprights connected by two pairs of thinner zones to two upper and lower horizontal beams, one of these uprights being intended for fixation of the block to a base and the other of such uprights being intended for securement to a reception plate for a load to be weighed, such sensor also comprising elements responsive to a flexural deformation associated with at least one zone of the block, thinner in the direction of the height, such block being characterized in that, in combination:

the block is reduced to a deformable parallelogram comprising a single central recess therein and its height lower than its length in substantially higher than its width;

the elements sensitive to flexural deformation are disposed on a substantially planar horizontal face of the block opposite two thinner zones through which one of the horizontal beams is connected to the vertical uprights; and the flexibility of the thinner zones of the beam carrying said sensitive elements is higher than the flexibility of the thinner zones of the other of the horizontal beams.

It will be noted that this invention proposes a group of characteristics the combination of which is neither described nor suggested in the above mentioned documents. It will also be noted that it was already known from documents such as patent application No. EP-0 107 966 A to use in a force sensor for weighing such a block having a central recess therein but that these documents constantly propose to keep high symmetry in the block geometry with strain gauges associated with each thinner zone, the various thinner zones presenting one and the same flexibility. The invention proposes however to renounce symmetry taught actually by almost all of the known devices as regards both the disposition of the deformation detection members and the geometry and mechanical characteristics of the different thinner zones.

In the case where upper and lower beams are of a same material, such difference in flexibility may be obtained through a difference (in opposite sense) between the thicknesses of the thinner zones of both beams. Such flexibility difference may also be obtained thanks to appropriate differences between widths or mechanical properties of said thinner zones (or of the beams in which the latter are provided).

The sensitive elements or members are preferably carried by the upper beam.

In a preferred mode of embodiment of the invention, the members sensitive to flexural deformation are flexible and preferably belong to a supple circuit adapted to follow up deformations of the upper beam of the block consisting for example of a printed circuit board. The above mentioned sensitive members are advantageously added directly to the upper face of the block, by glueing for example, or they are connected thereto through a supple supporting layer; they may be obtained on this block thanks to any other known method.

For simplicity of machining the central recess of a block is advantageously formed by a central cylindric bore connecting four smaller cylindric bores bordering the thinner zones and disposed as a rectangle. As a matter of fact, it is known that perforation of holes is a particularly cheap machining operation. In fact, only the geometry of the thinner zones is important especially those of the upper beam so that the rest of the central recess can be obtained with entirely medium tolerances.

According to an advantageous form of embodiment of the invention the parallelepipedic block is made of two parts advantageously from two materials, i.e. a flexure blade portion carrying the sensitive elements and a U-shaped frame. This form of embodiment in two portions facilitates manufacturing of the block (through cutting for example of two U-shaped frames disposed head to foot in a plate, with a lesser loss of metal than in case of a single piece block), on the one hand, and on the other hand, facilitates fixation about the sensitive elements of a sealed insulation sleeve such as a metallic bellows. Such arrangement is also advantageous in that it permits a plurality of flexural blades of different performances to be mounted on one and the same frame, whereas such a blade can be used under certain applications all alone without being added to a U-shaped frame, or on the contrary be mounted, selectively, on any of a plurality of U-shaped frames with differing mechanical properties and compositions.

Such a structure in two-parts of the parallelepipedic block allows, thanks to combination of different materials for the two-parts, or through selection of different widths, to obtain the flexibility difference aimed at according to the invention, even when using thinner zones of a same thickness.

Objects, characteristics and advantages of this invention will appear from the following description given by way of non limitative examples in the light of the attached drawings in which.

Figure 1:
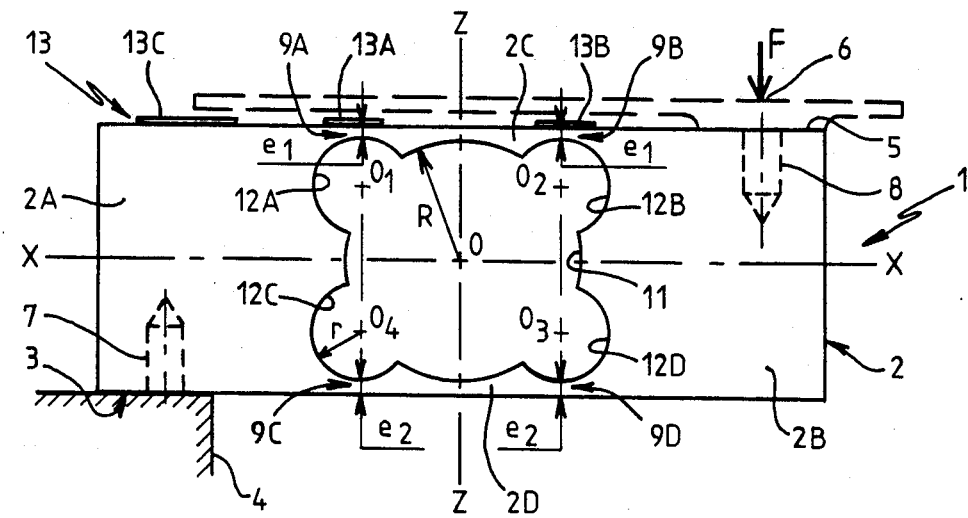
FIG. 1 is a lateral elevational view of a force sensor according to the invention.

FIG. 1 represents by way of example a force sensor 1 comprising a substantially parallelepipedic homogeneous block 2 presenting an application bearing 3 for securement thereof to a base, shown as at 4 and a reception bearing 5 diagonally opposite thereto adapted to be submitted to a force to be measured.

In practice, such reception bearing is adapted to receive for fixation a plate shown in dashed lines by reference character 6 and which is intended for supporting a mass to be weighed. The block 2 is formed with threads 7 and 8 therein for cooperation with fixation members not shown such as screws for securement thereof to the base 4 and the plate 6.

Said block has its larger dimension called "length" L according to a horizontal axis X—X and its smaller dimension called "width" according to an horizontal axis Y—Y perpendicular to the plane of FIG. 1. This block presents according to a vertical axis Z—Z parallel to the direction of the force to be measured F a dimension called "height" which is lower than the length and substantially higher than the width.

The block 2 is recessed in the direction of its width perpendicularly to axis X—X and Z—Z such that it comprises a first vertical upright 2A perpendicular to the application area 3, a second vertical upright 2B beneath the reception area 5 and two horizontal beams 2C and 2D respectively an upper and a lower one, connected to such uprights through thinner zones 9A and 9B, 9C and 9D. The thickness $e_1$ of the thinner zones 9A and 9B bordering the upper beam 2C as measured according to axis Z—Z is lower than the thickness $e_2$ of the thinner zones 9C and 9D bordering the lower beam 2D; flexibility of zones 9A and 9B is thus higher than flexibility of thinner zones 9C and 9D.

Advantageously, the central recess in the block 2 consists of a central cylindric bore 11 of radius R and of center O connecting four cylindric bores 12A through 12D of smaller radius r, each defining one of the thinner zones and centered according to the corners in a rectangle 01, 02, 03, 04 with sides parallel to axes X—X and Z—Z.

By way of example, in a block of 110×40×20 (in mm) R is equal to 17.5 mm, r to 7.5 mm and the thicknesses of the thinner zones are respectively $e_1 = 2.5$ mm and $e_2 = 3.5$ mm, with the thinner zones spaced 30 mm apart measured parallel to axis X—X (distance 01.02, or 03.04).

It has been experienced that for obtaining good accuracy it was desirable for the sum $e_1 + e_2$ to be higher than a nominal value (of for example 1.8 mm in the above-mentioned case) and that it was advantageous for obtaining low sensitivity to eccentric loads that the difference $e_2 - e_1$ should be higher than a minimum value different from 0 (of 0.6 for example in the case considered).

On the upper face of block 2 and opposite the thinner zones 9A and 9B of maximal flexibility, sensitive elements 13A and 13B are disposed, responsive to flexural deformation of such zones. These sensitive elements are connected within a supple circuit 13 comprising a residual portion 13C above the vertical upright 2A, i.e. in a neutral zone as regards strain or deformation.

Figure 2:
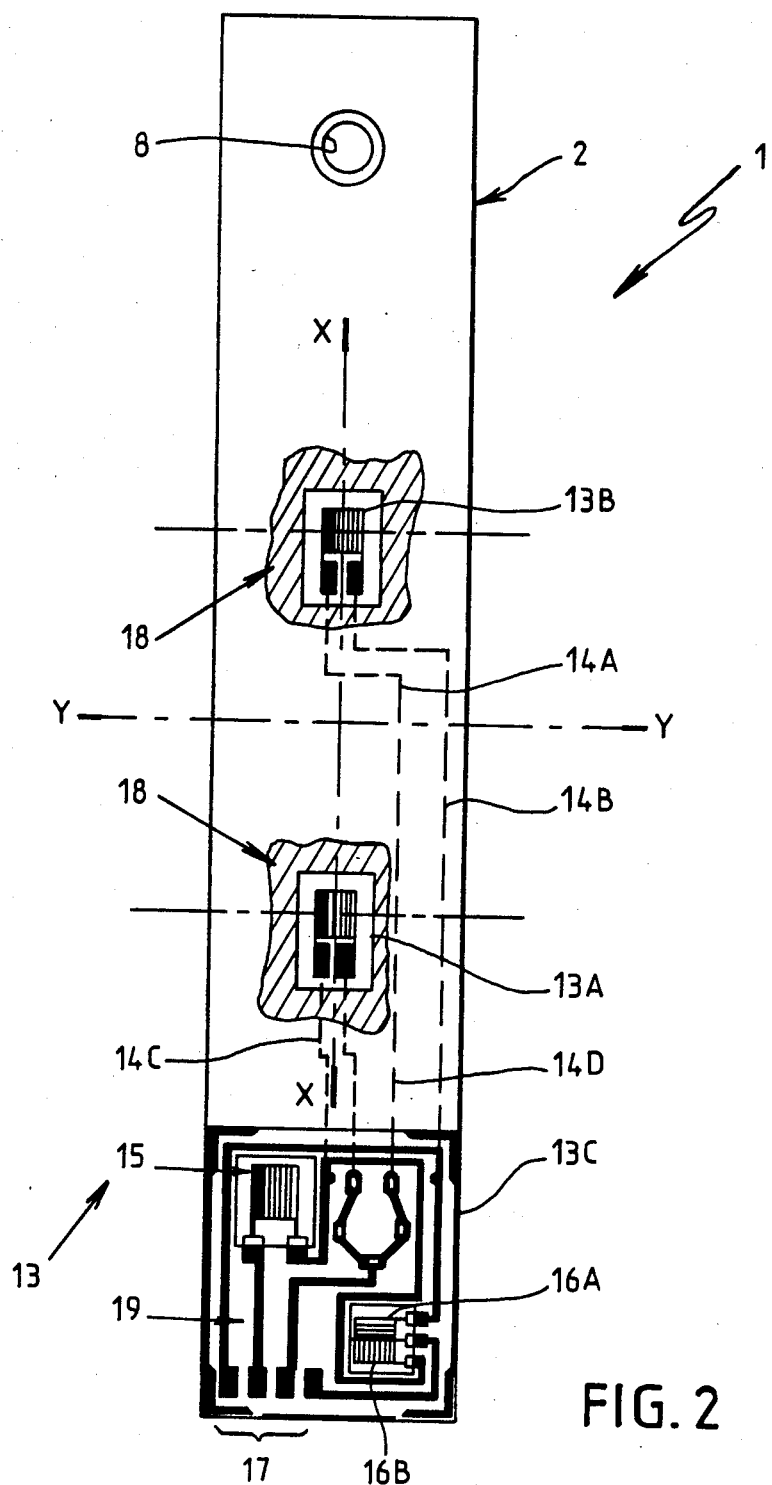
FIG. 2 is a top view thereof on a larger scale.

Details of such supple circuit 13 appear in FIG. 2 which shows the upper section of block 2.

It is to be noted that according to an advantageous embodiment of the invention, the sensitive elements and the rest of the circuit 13 are brought to a very narrow surface.

The circuit 13 of FIG. 2 comprises sensitive elements 13A and 13B consisting of strain gauges which are connected through tin-plated wires 14A, 14B, 14C and 14D to the partial circuit 13C comprising a grid 15 to compensate for temperature drift in sensitivity, and the inactive gauges 16A and 16B. Such circuit comprises output terminals 17.

In a modified form of embodiment not shown, the inactive gauges are secured to a vertical face of the block.

The supple circuit 13 is obtained directly by glueing active gauges 13A and 13B to the thinner zones 9A and 9B (glueing zones appear at 18 in FIG. 2) by glueing a circuit carrier 19 (printed circuit board) comprising conductive lines, then by glueing the grid 15 and the inactive gauges 16A and 16B to such carrier. These glueings are practically followed with disposal thereof into oven to thermally consolidate under pressure fixation of these elements.

In a modified form of embodiment not shown the residual portion 13C of the circuit 13 is located between the sensitive elements 13A and 13B (this is for example a polyamide layer or an epoxy resin layer of a thickness of about 10 microns). Again according to another modified form of embodiment, the portions 13A, 13B and 13C belong to one and the same continuous circuit.

Figure 3:
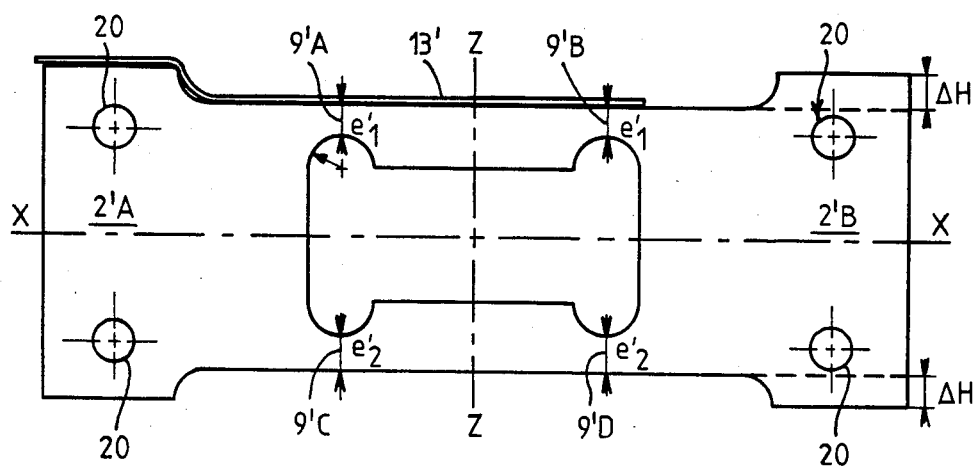
FIG. 3 is a lateral elevational view of a force sensor according to a modified form of embodiment of the sensor of FIG. 1.

FIG. 3 shows a modified form of embodiment of FIG. 1 in which the vertical upright 2'A and 2'B of the block 2' have an increased height 2ΔH relative to the remainder of the block (thereby to permit easier securement to a base or a plate) and the thinner zones 9'A, 9'B, 9'C and 9'D are determined by little bores connected together by a rectangular central bore. The block 2' also presents bores 20 in the direction of the width in the vertical uprights and by means of which such uprights can be secured to said base or said plate. The supple circuit 13' is continuous and extends up to the left-hand upper corner of the block.

According to an advantageous form of embodiment of the invention, the parallelepipedic block of a force sensor according to the invention is made of two sections possibly obtained in parallel manufacturing steps which are however distinct from materials that may be different (metal and/or plastics, resin . . .).

Figure 4:
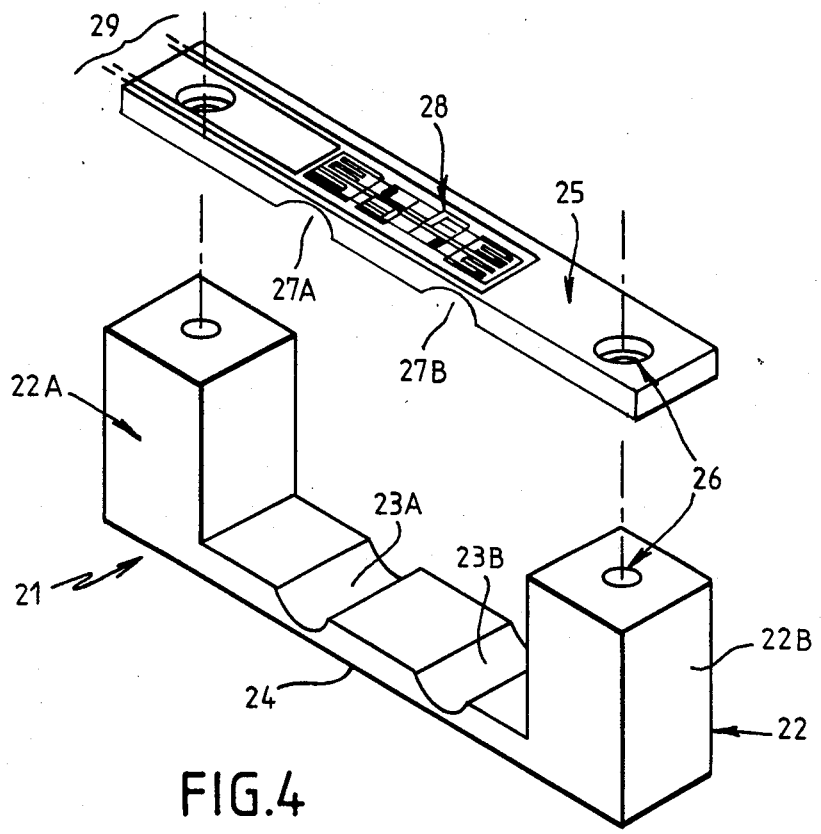
FIG. 4 is a perspective view of a force sensor according to the invention in accordance with another form of embodiment.

FIG. 4 illustrates a block 21 comprising a U-shaped frame 22 comprising vertical uprights 22A and 22B connected at their bases through thinner zones 23A and 23B to a horizontal beam 24 as well as a flexural blade 25, which may be of less width (as shown) than block 21, adapted to be added to the upper portion of the frame 22 for example through screws by means of bores and threads 26 therein formed at the ends of said blade and at the upper portion of the uprights 22A and 22B. To this flexure blade 25 there is added a continuous circuit 28 extending continuously above and between the thinner zones 27A and 27B. With such circuit 28 there are associated output wires 29.

Figure 5:
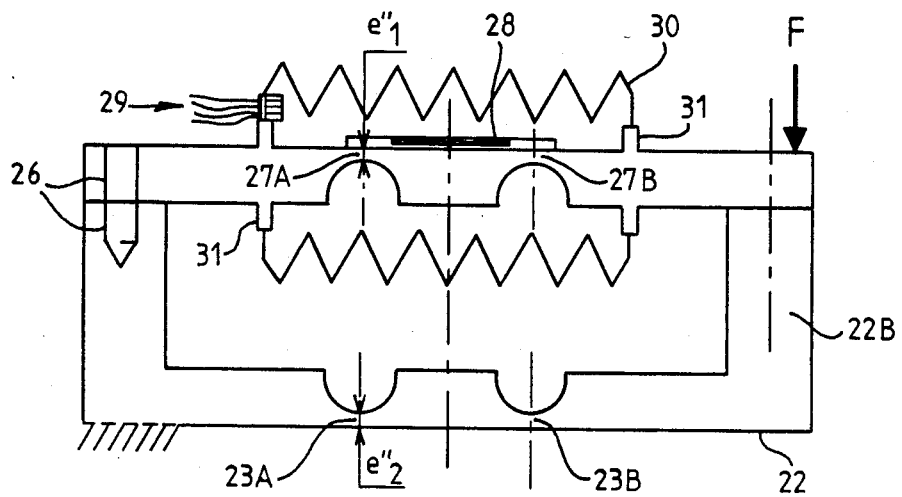
FIG. 5 is an elevational view of an example of application of the force sensor of FIG. 4.

FIG. 5 shows an arrangement which illustrates the advantage of the conformation of the block 21 from two sections. In such figure the flexural blade 25 is effectively secured to the U-shaped frame 22, the latter being added to a base 4 and a diagonally opposite end of the flexural blade constitutes a reception area for a force F to be measured.

Advantageously, securement means (not shown) provide for fixation of both a reception plate for a load to be weighed and such flexure blade to the upright 22B of the frame.

The circuit 28 added to the upper face of the flexural blade 25 is disposed as a whole within a sealed enclosure consisting of a sealed insulation sleeve, constituted here by metallic bellows 30 adapted to follow up flexions of such flexural bar; fixation of said bellows is facilitated by the presence of shoulders 31 projecting vertically. It is possible to mount the bellows 30 without longitudinal welding according to axis X—X in view of the removable mounting of the blade 25 in respect to the remainder of the block 21.

The flexibility of thinner zones 27A and 28B is higher than the flexibility of thinner zones 23A and 23B. This difference may be obtained as previously stated through selecting $e''_1$ less than $e''_2$; taking advantage of the 2-part structure of the block, one may also use a flexural blade of width less than the width of the U-shaped frame, or a blade made of a more flexible material. There may also be contemplated, for the thinner zones, differences in their height, in their width (or even in their length, with different curvature radii) as well as in their constitutive material.

It will be understood that the preceding description was only given indicatively and not limitatively and that many varied forms of embodiment can be proposed by the man of the art without however departing from the scope of the invention, in particular, one can combine the above mentioned advantageous forms of embodiment so that the blocks of FIGS. 1 and 3 can be realized in two sections and so that the form of the central recess can be modified in many ways.

The thinner zones of maximal flexibility may be located at lower portion of the block; flexural blades may constitute a lower beam of a block according to the invention.

It may be noted that, according to different preferred features of the invention, which are common to the illustrated embodiments:

the central opening is symmetrical with respect to an horizontal plane parallel to axes X—X and Y—Y;

the central opening is symmetrical with respect to a transverse vertical plane containing axes Y—Y and Z—Z or parallel thereto;

the thinner zones respectively located on upper and lower beams facing each other are centered with respect to two parallel planes;

these thinner zones are preferably delimited by transverse bores, the axes of which are lying by pairs in two parallel planes; and the strain gauges are located in a symmetrical manner with respect to corresponding thinner zones, parallel to axis X—X.

I claim:

1. A force sensing device for use in a weighing instrument, comprising a substantially parallelepipedic block with maximum and minimum dimensions, respectively called length and width, measured according to perpendicular horizontal axes and an intermediate dimension called height measured according to a vertical axis, such block being provided with a central opening in the direction of its width so as to consist in a deformable parallelogram with two vertical uprights connected through two pairs of thinner zones to two upper and lower horizontal beams, with one of these uprights being intended for fixation of the block to a base and the other of such uprights being intended for securement to a plate for reception of a load to be weighed, said sensing device further comprising means sensitive to flexural deformation and disposed on a substantially planar horizontal face of the block opposite two thinner zones through which one of the horizontal beams is connected to the vertical uprights, with flexibility of said thinner zones of the beam carrying said sensitive means being higher than flexibility of the thinner zones of the other of the horizontal beams.

2. A force sensing device according to claim 1, wherein said sensitive means are carried by said upper horizontal beam.

3. A force sensing device according to claim 2, wherein said flexural deformation sensitive means are a part of a supple electronic circuit added to the upper face of the block.

4. A force sensing device according to claim 3, wherein said supple circuit comprises two active strain gauges opposite said thinner zones and two inactive strain gauges connected to the active strain gauges so as to form a Wheatstone bridge and disposed opposite one zone of the upper surface of the block where deformation is zero, as well as a grid to compensate for the temperature drift in sensitivity on a power supply section.

5. A force sensing device according to claim 1, wherein said opening defining both pairs of thinner zones is formed from a main cylindric bore connecting four cylindric bores together disposed as a rectangle bordering said thinner zones.

6. A force sensing device according to claim 1, wherein said parallelepipedic block is made of a flexural blade comprising the beam carrying said sensitive means and an upper portion of each of the vertical uprights, and of a U-shaped frame to which said flexural blade is removably attached.

7. A force sensing device according to claim 6, wherein said flexural blade and said U-shaped frame are made of different materials.

8. A force sensing device according to claim 6, wherein said flexural blade extends through a deformable sleeve for sealingly isolating both thinner zones of such blade with respect to the outside.

9. A force sensing device according to claim 1, wherein said thinner zones of higher flexibility are of a thickness which is smaller than the thickness of said other thinner zones.

10. A force sensing device according to claim 1, wherein the central opening is symmetrical with respect to a horizontal plane.

11. A force sensing device according to claim 1, wherein the central opening is symmetrical with respect to a transverse vertical plane.

12. A force sensing device according to claim 1, wherein said thinner zones respectively located on upper and lower beams facing each other are centered with respect to two parallel planes.

13. A force sensing device according to claim 1, wherein said thinner zones are preferably delimited by transverse bores, the axes of which are lying by pairs in two parallel planes.

14. A force sensing device according to claim 1, wherein said sensitive means are located in a symmetrical manner with respect to corresponding thinner zones, parallel to the length axis.

15. A force sensing device for use in a weighing instrument, comprising a substantially parallelepipedic block with maximum and minimum dimensions, respectively called length and width, measured according to perpendicular horizontal axes and an intermediate dimension called height measured according to a vertical axis, such block being provided with a central opening in the direction of its width so as to consist in a deformable parallelogram with two vertical uprights connected through two pairs of thinner zones to two upper and lower horizontal beams, with one of these uprights being intended for fixation of the block to a base and the other of such uprights being intended for securement to a plate for reception of a load to be weighed, said sensing device further comprising means sensitive to flexural deformation and disposed on a substantially planar horizontal face of the block opposite two thinner zones through which one of the horizontal beams is connected to the vertical uprights, with flexibility of said thinner zones of the beam carrying said sensitive means being higher than flexibility of the thinner zones of the other of the horizontal beams, said parallelepipedic block being made of a flexural blade comprising the beam carrying said sensitive means and an upper portion of each of the vertical uprights, and of a U-shaped frame to which said flexural blade is removably attached, said flexural blade having a width which is smaller than said width of the U-shaped frame.

* * * * *